(12) United States Patent
Kitagawa et al.

(10) Patent No.: US 11,791,753 B2
(45) Date of Patent: Oct. 17, 2023

(54) MOTOR DRIVE SYSTEM

(71) Applicant: Mitsubishi Electric Corporation, Tokyo (JP)

(72) Inventors: Shoya Kitagawa, Tokyo (JP); Yuji Igarashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/029,662

(22) PCT Filed: May 24, 2021

(86) PCT No.: PCT/JP2021/019632
§ 371 (c)(1),
(2) Date: Mar. 31, 2023

(87) PCT Pub. No.: WO2022/249245
PCT Pub. Date: Dec. 1, 2022

(65) Prior Publication Data
US 2023/0275531 A1    Aug. 31, 2023

(51) Int. Cl.
*H02K 41/00* (2006.01)
*H02P 1/00* (2006.01)
(Continued)

(52) U.S. Cl.
CPC .............. *H02P 6/006* (2013.01); *H02P 21/18* (2016.02); *H02P 21/22* (2016.02)

(58) Field of Classification Search
CPC ........... H02P 6/006; H02P 21/18; H02P 21/22
(Continued)

(56) References Cited

U.S. PATENT DOCUMENTS

| 2015/0035458 A1* | 2/2015 | Takase | H02P 25/06 318/135 |
| 2015/0303841 A1 | 10/2015 | Suzuki et al. | |
| 2020/0333762 A1* | 10/2020 | Hirose | G05B 19/404 |

FOREIGN PATENT DOCUMENTS

| JP | S63-43501 A | 2/1988 |
| JP | H03-45105 A | 2/1991 |

(Continued)

OTHER PUBLICATIONS

International Search Report and Written Opinion dated Jul. 20, 2021, received for PCT Application PCT/JP2021/019632, filed on May 24, 2021, 8 pages including English Translation.
(Continued)

*Primary Examiner* — Erick D Glass
(74) *Attorney, Agent, or Firm* — XSENSUS LLP

(57) ABSTRACT

A motor drive system includes motor drive control devices supplying first and second powers to first and second coils, respectively. The first motor drive control device includes: a detector communication unit acquiring a mover movement detection value; a position and speed control unit generating a thrust command to cause the movement detection value to follow a time-series movement target value received from an external device; and a current control unit supplying, to the first coils, the first power to cause thrust generated on the mover to follow the thrust command, and generating data on third power to be supplied to the second coils and transmitting the data to the second motor drive control device when the mover moves from the first coil to the second coil. The second motor drive control device supplies the second power calculated using the data on the third power to the second coils.

7 Claims, 11 Drawing Sheets

(51) Int. Cl.
*H02P 3/00* (2006.01)
*H02P 5/00* (2016.01)
*H02P 6/00* (2016.01)
*H02P 21/18* (2016.01)
*H02P 21/22* (2016.01)

(58) Field of Classification Search
USPC .......................................................... 318/135
See application file for complete search history.

(56) References Cited

FOREIGN PATENT DOCUMENTS

| | | |
|---|---|---|
| JP | 4-229092 A | 8/1992 |
| JP | 2015-33240 A | 2/2015 |
| JP | 2015-208083 A | 11/2015 |

OTHER PUBLICATIONS

Decision to Grant dated Dec. 14, 2021, received for JP Application 2021-568421, 5 pages including English Translation.

\* cited by examiner

MOTOR DRIVE SYSTEM

CROSS-REFERENCE TO RELATED APPLICATION

The present application is based on PCT filing PCT/JP2021/019632, filed May 24, 2021, the entire contents of which are incorporated herein by reference.

FIELD

The present disclosure relates to a motor drive system for driving a motor.

BACKGROUND

In a motor such as a linear motor, for example, magnets are disposed on a mover and coils on a stator. It is desirable for motor drive control devices for driving such a motor to stably move the mover.

Patent Literature 1 discloses a linear motor conveyance apparatus in which multiple DC linear motors (hereinafter, referred to as DLMs) are connected successively, and when a mover moves to the last U-, V-, and W-phases of a DLM, a control circuit in the next stage reads the coil drive statuses of the U-, V-, and W-phases and position information on the mover to control the movement of the mover. Thus, the linear motor conveyance apparatus disclosed in Patent Literature 1 stabilizes the movement of the mover between the DLMs.

CITATION LIST

Patent Literature

Patent Literature 1: Japanese Patent Application Laid-open No. H03-045105

SUMMARY

Technical Problem

However, in the technique of Patent Literature 1 described above, when the mover passes between adjacent coils, only one of the control circuits controls the mover. Consequently, thrust force is not generated from a coil that is not controlled by the control circuit, and what is generated is only thrust force obtained from only the coil(s) controlled by the control circuit. For this reason, there has been a problem that thrust force on the mover drops when the mover passes between adjacent coils, and the mover cannot be moved smoothly.

The present disclosure has been made in view of the above circumstances, and an object thereof is to provide a motor drive system capable of moving a mover smoothly by preventing a drop in thrust on the mover when the mover passes between the adjacent coils.

Solution to Problem

In order to solve the above-mentioned problem and achieve the object, the present disclosure provides a motor drive system, comprising: a first motor drive control device to supply first power to first coils of a coil group consisting of a plurality of coils arranged successively; and a second motor drive control device to supply second power to second coils of the coil group that are adjacent to the first coils, wherein the first motor drive control device comprises: a movement information communication unit to acquire a movement detection value representing a movement position or a movement speed of a mover moving along the first coils; a position and speed control unit to generate a thrust command to the mover that is a command to cause the movement detection value to follow a movement target value that is a time-series movement target value received from an external device; and a current control unit to supply, to the first coils, the first power to cause thrust generated on the mover to follow the thrust command, and generate data on third power to be supplied to the second coils and transmit the data on the third power to the second motor drive control device when the mover moves from the first coil to the second coil, and the second motor drive control device supplies the second power calculated using the data on the third power to the second coils.

Advantageous Effects of Invention

The motor drive system according to the present disclosure has an advantageous effect that it can move the mover smoothly by preventing a drop in thrust on the mover when the mover passes between coils adjacent to each other.

DESCRIPTION OF EMBODIMENTS

Hereinafter, a motor drive system according to embodiments of the present disclosure will be described in detail with reference to the drawings.

First Embodiment

Figure 1:
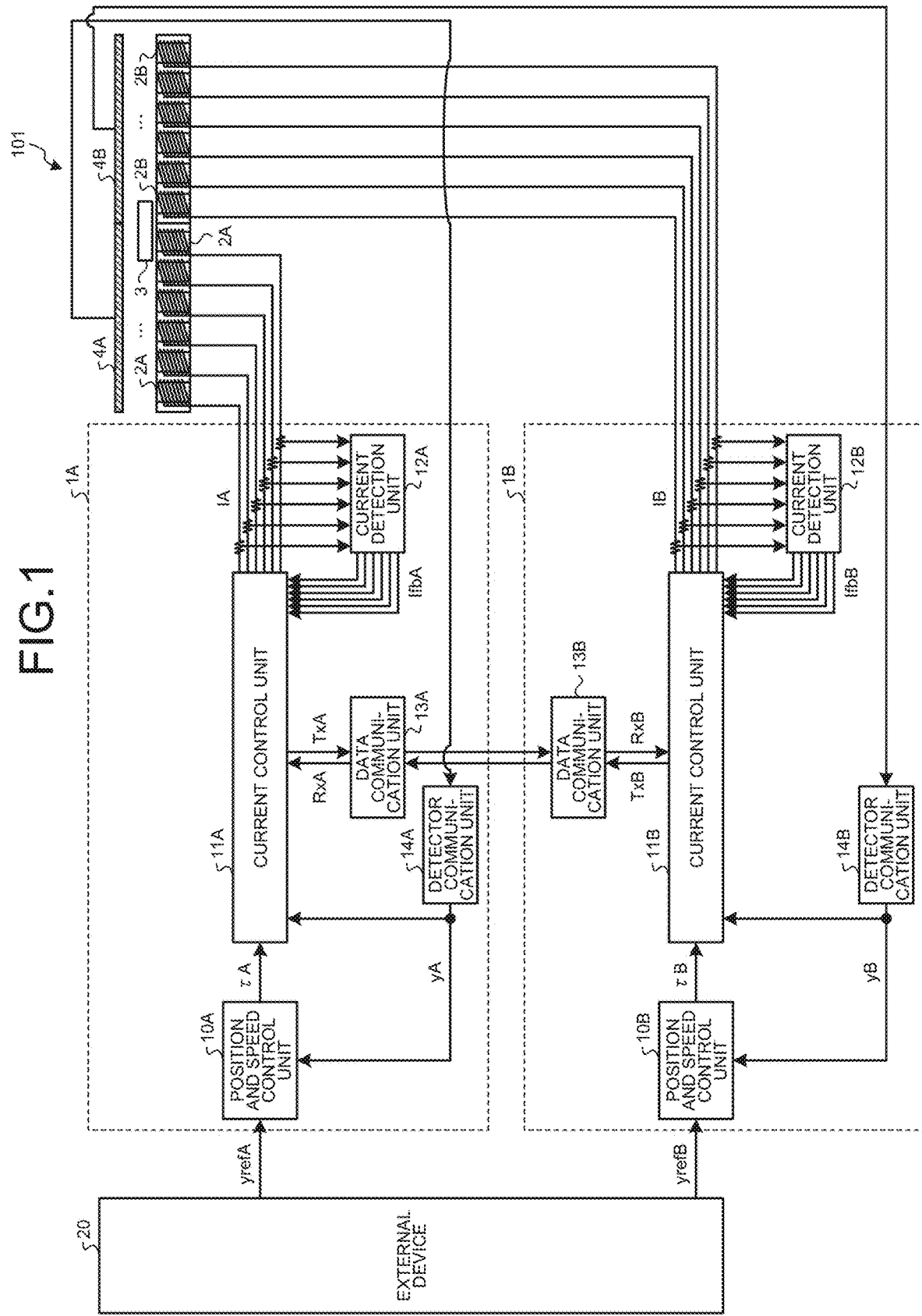
FIG. 1 is a diagram illustrating a configuration of a motor drive system including motor drive control devices according to a first embodiment.

FIG. 1 is a diagram illustrating a configuration of a motor drive system including motor drive control devices according to a first embodiment. A motor drive system 101 includes motor drive control devices 1A and 1B, coils 2A and 2B, a mover 3, and position detectors 4A and 4B. The motor drive control device 1A is a first motor drive control device. The motor drive control device 1B is a second motor drive control device.

The motor drive control devices 1A and 1B are devices that are configured to drive a motor such as a moving magnet type linear motor, for example. It is noted that the motor drive control devices 1A and 1B can also drive a motor other than a moving magnet type linear motor. The motor drive control devices 1A and 1B may drive, for example, a moving coil type linear motor. The motor drive control devices 1A and 1B may drive not only a linear motor, but also a rotary motor. The first embodiment describes a case where the motor drive control devices 1A and 1B drive a moving magnet type linear motor.

The motor drive control devices 1A and 1B drive the motor by single-phase control. The motor drive control devices 1A and 1B are connected to the coils 2A and 2B, respectively and the position detectors 4A and 4B, respectively, and to an external device 20. FIG. 1 illustrates a case where the motor drive system 101 includes six coils 2A and six coils 2B. Six coils on the left side illustrated in FIG. 1 are the coils 2A, and six coils on the right side are the coils 2B. The coils 2A and 2B are a stator.

In the first embodiment, the motor drive system 101 includes a coil group consisting of the coils 2A and 2B having a form of twelve coils of the six coils 2A and the six coils 2B arranged sequentially. The six coils 2A are first coils, and the six coils 2B are second coils. In the following description, the six coils 2A are simply referred to as the coils 2A, and the six coils 2B are simply referred to as the coils 2B.

Examples of the external device 20 include a controller, a personal computer (PC), and a pulse generator for generating pulses. The mover 3 is, for example, a mobile object provided with magnets. The mover 3 moves along the coils 2A and 2B.

The position detector 4A detects the position of the mover 3 above the coils 2A, and the position detector 4B detects the position of the mover 3 above the coils 2B. The position detectors 4A and 4B transmit their respective detected positions to the motor drive control devices 1A and 1B. For example, the mover 3 may move from above the coils 2A to above the coils 2B. In this case, when the mover 3 crosses between the coils 2A and 2B, the position detector 4A detects the position of the mover 3 while a specific area (first area) of the mover 3 is above coil or the coils 2A. Then, when a specific area (second area) of the mover 3 reaches above the coil or coils 2B, the position detector 4B detects the position of the mover 3. Alternatively, when the mover 3 crosses between the coils 2A and 2B, both the position detector 4A and the position detector 4B may detect the position of the mover 3.

Each of the position detectors 4A and 4B may calculate the movement speed of the mover 3 based on the movement position of the mover 3. In this case, the position detectors 4A and 4B transmit their respective movement speeds of the mover 3 to the motor drive control devices 1A and 1B, respectively.

The motor drive control device 1A receives, from the position detector 4A, a movement detection value yA representing the movement position, the movement speed, or the like of the mover 3. In addition, the motor drive control device 1A receives, from the external device 20, a movement target value yrefA indicating a target value of the movement position or the movement speed for the mover 3. The motor drive control device 1A supplies electric power IA to the coils 2A such that the movement detection value yA follows the movement target value yrefA.

Likewise, the motor drive control device 1B receives, from the position detector 4B, a movement detection value yB representing the movement position, the movement speed, or the like of the mover 3. In addition, the motor drive control device 1B receives, from the external device 20, a movement target value yrefB indicating a target value of the movement position or the movement speed for the mover 3. The motor drive control device 1B supplies electric power IB to the coils 2B such that the movement detection value yB follows the movement target value yrefB. The power IA is first power, and the power IB is second power.

The motor drive control device 1A includes a position and speed control unit 10A, a current control unit 11A, a current detection unit 12A, a data communication unit 13A, and a detector communication unit 14A. The motor drive control device 1B includes a position and speed control unit 10B, a current control unit 11B, a current detection unit 12B, a data communication unit 13B, and a detector communication unit 14B.

The motor drive control device 1A and the motor drive control device 1B have their respective equal functions. That is, the position and speed control units 10A and 10B have their respective equal functions, and the current control units 11A and 11B have their respective equal functions. The current detection units 12A and 12B have their respective equal functions, the data communication units 13A and 13B have their respective equal functions, and the detector communication units 14A and 14B have their respective equal functions.

The current detection units 12A and 12B detect electric currents flowing through the coils 2A and 2B for individual phases, respectively, and output the detected current values IfbA and IfbB for the phases to the current control units 11A and 11B, respectively.

The detector communication units 14A and 14B, which are movement information communication units, receive signals (movement information) indicating the position, speed, or the like of the mover 3 from the position detectors 4A and 4B, respectively, and output values corresponding to the received signals as the movement detection values yA and yB to the position and speed control units 10A and 10B, respectively, and to the current control units 11A and 11B, respectively.

The position and speed control units 10A and 10B output thrust commands TA and TB to the current control units 11A and 11B, respectively, so that the movement detection values yA and yB follow the movement target values yrefA and yrefB of the mover 3 inputted from the external device 20. The thrust command TA is a command value of thrust to be generated on the mover 3 above the coils 2A. The thrust command TB is a command value of thrust to be generated on the mover 3 above the coils 2B.

The current control units 11A and 11B acquire the thrust commands TA and IB from the position and speed control units 10A and 10B, respectively, and acquire the movement detection values yA and yB from the detector communication units 14A and 14B, respectively. The current control units 11A and 11B acquire the current values IfbA and IfbB for the individual phases from the current detection units 12A and 12B, respectively, and acquire reception data sets RxA and RxB acquired by data communication from the data communication units 13A and 13B, respectively. The reception data RxA and RxB will be described later.

The current control units 11A and 11B calculate the power IA and IB and transmission data sets TxA and TxB, based on the thrust commands τA and τB, the movement detection values yA and yB, the current values IfbA and IfbB, and the reception data sets RxA and RxB, respectively.

The current control units 11A and 11B output the powers IA and IB to the coils 2A and 2B so that the thrust generated on the mover 3 follows the thrust commands τA and τB, respectively, and output the transmission data sets TxA and TxB to the data communication units 13A and 13B, respectively.

The transmission data set TxA is data transmitted from the current control unit 11A to the current control unit 11B when the mover 3 moves from the coils 2A to the coils 2B. The transmission data set TxB is data transmitted from the current control unit 11B to the current control unit 11A when the mover 3 moves from the coils 2B to the coils 2A. The transmission data set TxA is data specifying electric power to be supplied to the coils 2B. The transmission data TxB is data specifying electric power to be supplied to the coils 2A. Details of the transmission data sets TxA and TxB will be described later. Hereinafter, the power specified by the transmission data set TxA is referred to as a power IBd, and the power specified by the transmission data set TxB is referred to as a power IAd. The power IBd is a third power, and the power IAd is a fourth power.

When calculating the power IBd to be supplied to the coils 2B, the current control unit 11A uses information such as the coil positions for the individual phases of the coils 2B together with position information of the mover 3. When calculating the power IAd to be supplied to the coils 2A, the current control unit 11B uses information such as the coil positions for the individual phases of the coils 2A together with position information of the mover 3.

In the first embodiment, in both cases of the powers IA or IB and the current values IfbA or IfbB for the individual phases detected by the current detection units 12A or 12B, their representation is made by one symbol, but this does not mean that the powers IA or IB generated in the individual phases, or the current values IfbA or IfbB for the individual phases detected by the current detection units 12A or 12B are all the same. In reality, the generated powers IA or IB may differ from each other and the current values IfbA or IfbB flowing through the individual phases may differ from each other.

That is, the six powers IA outputted from the current control unit 11A may have their respective different values. Likewise, the six powers IB outputted from the current control unit 11B may have their respective different values. In addition, the six current values IfbA detected by the current detection unit 12A may be different values, respectively. Likewise, the six current values IfbB detected by the current detection unit 12B may be different values, respectively.

In the first embodiment, the motor drive control devices 1A and 1B may use any method of supplying the powers IA and IB to the coils 2A and 2B so as to follow the thrust commands τA and τB, respectively.

The data communication units 13A and 13B acquire the transmission data sets TxA and TxB from the current control units 11A and 11B, respectively. The data communication unit 13A is a first data communication unit, and the data communication unit 13B is a second data communication unit. In the motor drive system 101, when the mover 3 moves from the coils 2A to the coils 2B, the data communication unit 13A transmits the transmission data set TxA to the data communication unit 13B, and the data communication unit 13B receives the transmission data set TxA from the data communication unit 13A. Then, the data communication unit 13B outputs the received transmission data set TxA as the reception data RxB to the current control unit 11B. The reception data RxB is data in which the power IBd to be supplied to the coils 2B is specified.

Likewise, in the motor drive system 101, when the mover 3 moves from the coils 2B to the coils 2A, the data communication unit 13B transmits the transmission data set TxB to the data communication unit 13A, and the data communication unit 13A receives the transmission data set TxB from the data communication unit 13B. Then, the data communication unit 13A outputs the received transmission data set TxB as the reception data RxA to the current control unit 11A. The reception data RxA is data in which the power IAd to be supplied to the coils 2A is specified.

Next, information processing in the motor drive control devices 1A and 1B will be described. Here, a case where the mover 3 moves from above the coils 2A to above the coils 2B will be described. When the entire mover 3 is above the coils 2A, the current control unit 11A supplies the powers IA to the coils 2A so that the same thrust as the thrust command TA calculated by the position and speed control unit 10A is generated on the mover 3. In this case, the motor drive control device 1A can easily generate the same thrust as the thrust command TA on the mover 3, thereby making it possible to perform highly accurate positioning or highly accurate speed control.

Figure 2:
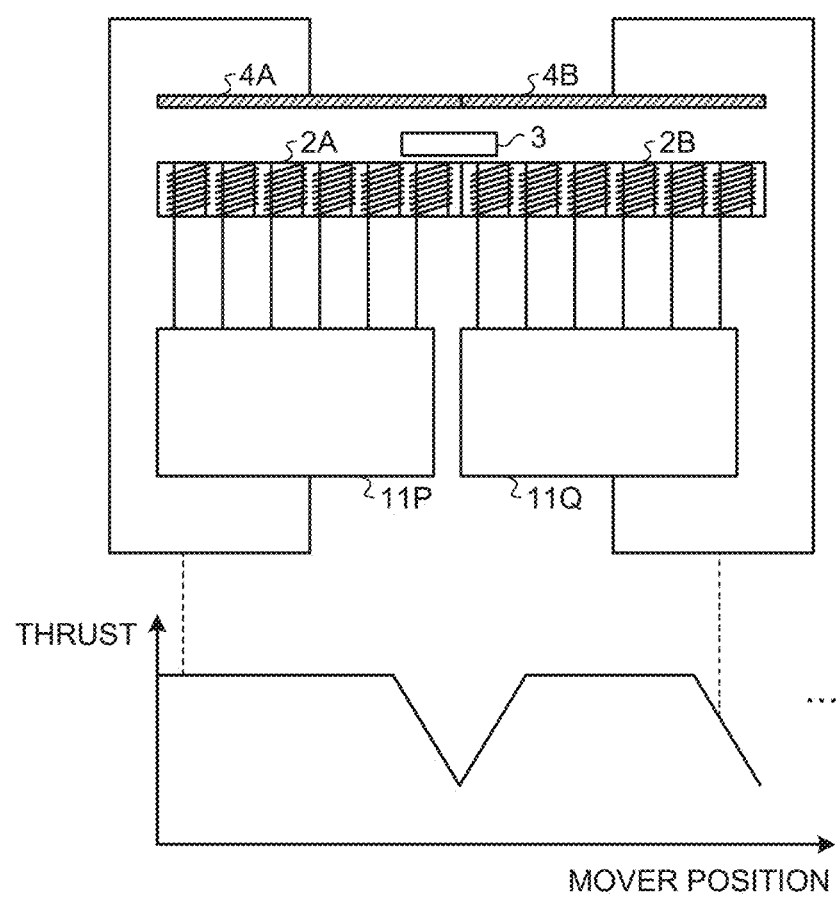
FIG. 2 is a diagram for explaining the transition of thrust force when motor drive control devices in a comparative example move a mover.

When the mover 3 is in a position across a boundary between the coil 2A and the coil 2B, the number of the coils 2A above which the mover 3 is situated is reduced. FIG. 2 is a diagram for explaining the transition of a thrust force when motor drive control devices in a comparative example move a mover. The horizontal axis of a graph illustrated in FIG. 2 represents the position of the mover 3, and the vertical axis represents a thrust force on the mover 3.

The motor drive control devices in the comparative example include current control units 11P and 11Q instead of the current control units 11A and 11B. The motor drive control devices in the comparative example have the same configuration as the motor drive control devices 1A and 1B except for the current control units 11P and 11Q.

The current control units 11A and 11B are connected to each other via the data communication units 13A and 13B, but the current control units 11P and 11Q are not connected to each other. That is, the current control unit 11P does not acquire data from the motor drive control device 1B, and the current control unit 11Q does not acquire data from the motor drive control device 1A.

As illustrated in FIG. 2, in the motor drive control devices in the comparative example, when the mover 3 is at or near the boundary between the coils 2A and 2B, the number of the coils 2A above which the mover 3 is situated is reduced, so that a thrust force on the mover 3 that can be generated by the motor drive control devices in the comparative example becomes smaller. That is, in the motor drive control devices in the comparative example, the thrust force on the mover 3 is smaller when the mover 3 is at or near the boundary between the coils 2A and 2B than when the entire mover 3 is situated above the coils 2A.

This causes a deviation between the thrust generated by the mover 3 and the thrust command TA calculated by the position and speed control unit 10A. This deviation causes a shock to the mover 3 when the mover 3 moves from the coil 2A to the coil 2B, or when the mover 3 moves from the coil 2B to the coil 2A. Further, it becomes difficult to perform highly accurate positioning or highly accurate speed control at or near the boundary between the coil 2A and the coil 2B.

In the first embodiment, in order to smoothly move the mover 3, the current control unit 11A calculates not only the power IA to be supplied to the coils 2A but also the power IBd to be supplied to the coils 2B at the same time so that the same thrust as the thrust command τA calculated by the position and speed control unit 10A is generated on the mover 3. That is, the current control unit 11A calculates the power IBd for causing the coils 2B to generate thrust on the mover 3 to compensate for insufficient thrust obtained by the coils 2A. Then, the current control unit 11A outputs the calculated power IBd to be supplied to the coils 2B as the transmission data TxA to the data communication unit 13A.

The data communication unit 13A transmits the transmission data TxA to the data communication unit 13B of the motor drive control device 1B. The data communication unit 13B receives the transmitted transmission data TxA and transmits the transmission data TxA as the reception data RxB to the current control unit 11B. Thus, information on the power IBd to be supplied to the coils 2B calculated by the current control unit 11A is transmitted to the current control unit 11B.

The current control unit 11B acquires, from the reception data RxB, the power IBd to be supplied to the coils 2B calculated by the current control unit 11A, combines the power IBd and power to be supplied to the coils 2B calculated by the current control unit 11B itself into the power IB, and supplies the power IB to the coils 2B. The current control unit 11A supplies the power IA to the coils 2A.

Figure 3:
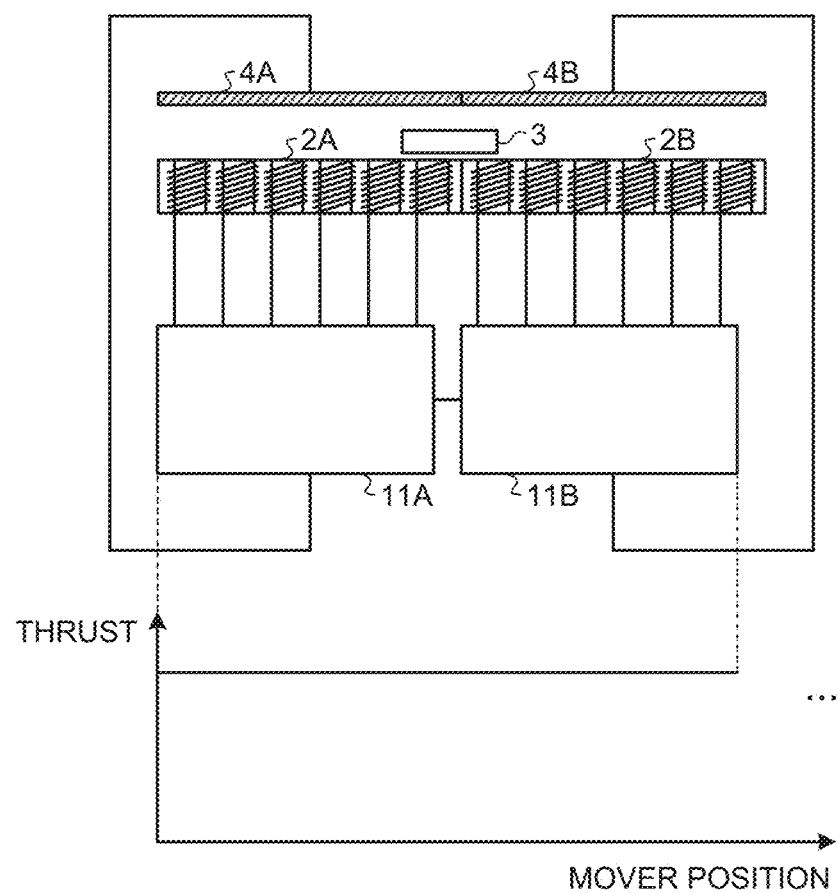
FIG. 3 is a diagram for explaining the transition of thrust force when the motor drive control devices according to the first embodiment move a mover.

FIG. 3 is a diagram for explaining the transition of a thrust force when the motor drive control devices according to the first embodiment move the mover. The horizontal axis of a graph illustrated in FIG. 3 represents the position of the mover 3, and the vertical axis represents thrust on the mover 3.

The current control units 11A and 11B are connected to each other via the data communication units 13A and 13B (not illustrated in FIG. 3). When the mover 3 moves from the coil 2A to the coil 2B, the current control unit 11B acquires data on the power IBd to be supplied to the coils 2B from the motor drive control device 1A. Consequently, when the mover 3 crosses between the coils 2A and 2B, both the current control unit 11A and the current control unit 11B can drive the mover 3.

Therefore, as illustrated in FIG. 3, even when the mover 3 is situated at or near the boundary between the coils 2A and 2B, the motor drive control devices 1A and 1B can generate the same thrust as the thrust command TA calculated by the position and speed control unit 10A on the mover 3. Consequently, the motor drive control devices 1A and 1B can eliminate a shock to the mover 3 when the mover 3 moves from the coils 2A to the coils 2B and crosses between the coils 2A and 2B.

When the mover 3 moves from the coil 2B to the coil 2A, the motor drive control device 1B executes the processing of the motor drive control device 1A described above, and the motor drive control device 1A executes the processing of the motor drive control device 1B. This enables the motor drive control devices 1A and 1B to eliminate a shock to the mover 3 when the mover 3 moves from the coil 2B to the coil 2A and crosses between the coils 2A and 2B.

Consequently, the motor drive control devices 1A and 1B can achieve highly accurate positioning and highly accurate speed control of the mover 3 even at or near the boundary between the coils 2A and 2B. In this way, the motor drive control devices 1A and 1B can stop the mover 3 with higher accuracy even at or near the boundary between the coils 2A and 2B.

Note that the current control unit 11A does not need to calculate the power IBd to be supplied to all the coils 2B, and in actuality, it only has to calculate the power IBd only for a coil(s) of the coils 2B close to the coil 2A. By reducing the number of the coils 2B for which the power IBd is calculated, the current control unit 11A can reduce the number of sets of the transmission data TxA and the reception data RxB.

Likewise, the current control unit 11B does not need to calculate the power IAd to be supplied to all the coils 2A, and in actuality, it only has to calculate the power IAd only for a coil(s) of the coils 2A close to the coil 2B. By reducing the number of the coils 2A for which the power IAd is calculated, the current control unit 11B can reduce the number of sets of the transmission data TxB and the reception data RxA.

Although the first embodiment has described the case where the motor drive control devices are the two motor drive control devices 1A and 1B, the number of the motor drive control devices may be three or more. Also in the latter case, it is possible to obtain the same effects as those in the case where the number of the motor drive control devices is two. When the number of the motor drive control devices is three or more, one and the other disposed adjacently thereto of the motor drive control devices perform their mutual transmission and reception of the transmission data sets TxA and TxB.

The motor drive system 101 may be configured to move two or more movers 3. Also in this case, the motor drive control devices 1A and 1B perform substantially the same processing as the processing described above, thereby to drive the two or more movers 3 simultaneously.

Moving magnet type linear motors are suitable for long-distance conveyance because they are superior in wire routing to moving coil type linear motors that use a coil as a mover. When a moving magnet linear motor in which two or more movers 3 are present is applied to the motor drive system 101, in order to arrange as many movers 3 as possible along the entire length of the path of the movers 3, it is required to drive the movers 3 with the distance therebetween kept as short as possible. However, in a motor drive system using three phases, i.e., U-, V-, and W-phases, it is difficult to make the movers adjacent to each other within a distance corresponding to coils for the three U-, V-, and W-phases. Since the motor drive system 101 of the first embodiment drives the motor by the single-phase control, it is possible to easily make the movers 3 adjacent to each other within a distance shorter than a distance corresponding to three coils.

As described above, in the first embodiment, when the mover 3 moves from the coil 2A to the coil 2B, the current control unit 11A generates data on the power IBd to be supplied to the coils 2B and transmits the data to the current control unit 11B. Then, the current control unit 11B calculates the power IB to the coils 2B using the data on the power IBd, and supplies the power IB to the coils 2B. This enables the motor drive control devices 1A and 1B to prevent a drop in thrust on the mover 3 when the mover 3 passes between the coils 2A and 2B adjacent to each other, thereby smoothly moving the mover 3. Further, the motor drive control devices 1A and 1B can achieve highly accurate positioning and highly accurate speed control of the mover 3 even at or near the boundary between the coils 2A and 2B. Furthermore, since the motor drive control devices 1A and 1B drive the motor by the single-phase control, it is possible to drive the movers 3 with the distance therebetween reduced.

Second Embodiment

Next, a second embodiment will be described with reference to FIG. 4. A motor drive system of the second embodiment performs transmission and reception of data between motor drive control devices 1Ax and 1Bx via a controller 5.

Figure 4:
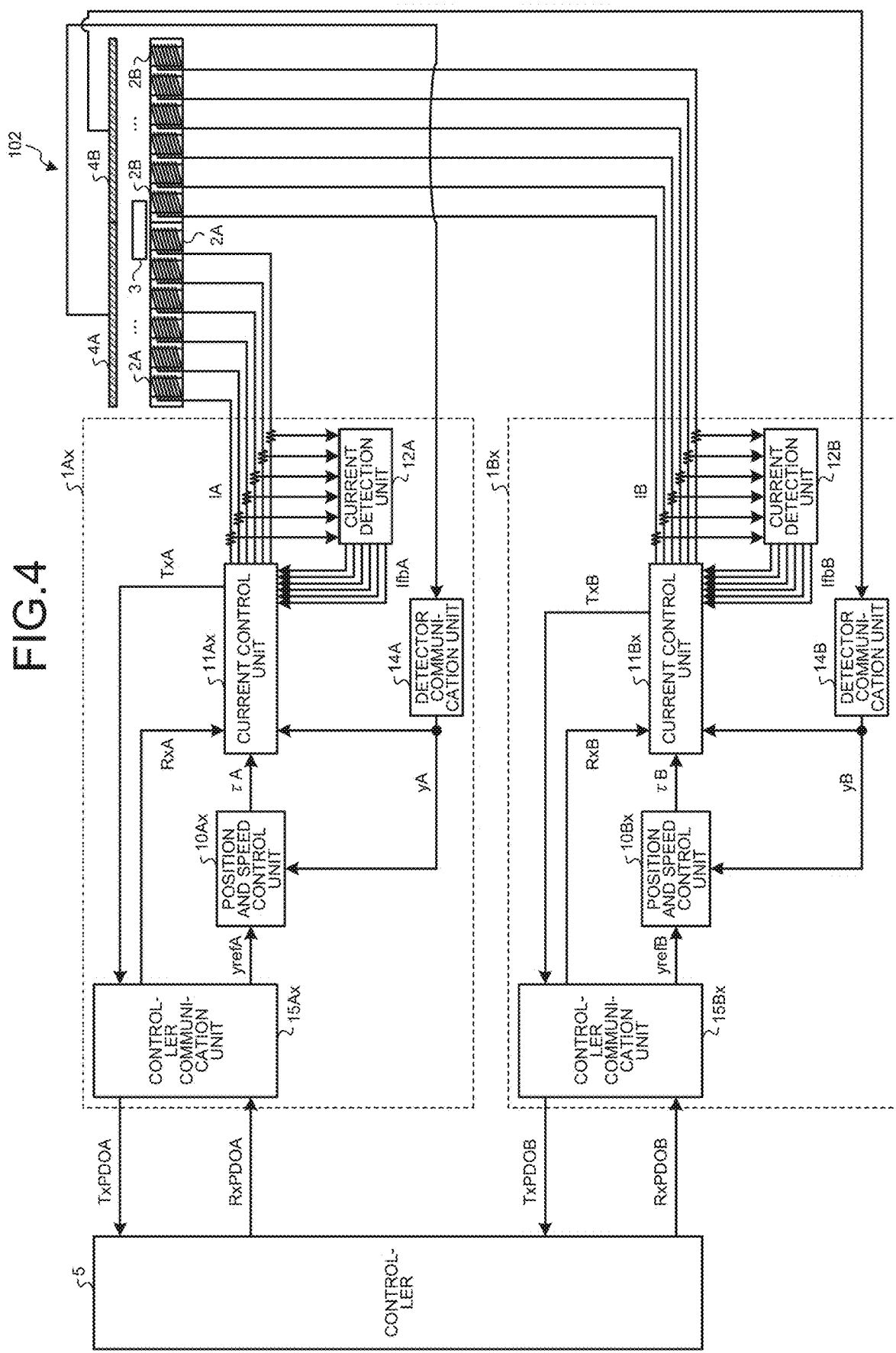
FIG. 4 is a diagram illustrating a configuration of a motor drive system including motor drive control devices according to a second embodiment.

FIG. 4 is a diagram illustrating a configuration of the motor drive system including the motor drive control devices according to the second embodiment. Of the components in FIG. 4, components that achieve the same functions as those of the motor drive system 101 of the first embodiment illustrated in FIG. 1 are denoted by the same reference signs and their redundant description is omitted.

The motor drive control devices 1Ax and 1Bx are devices that drive a motor by single-phase control as with the motor drive control devices 1A and 1B. When compared to the motor drive system 101, a motor drive system 102 includes the motor drive control devices 1Ax and 1Bx instead of the motor drive control devices 1A and 1B. That is, the motor drive system 102 includes the motor drive control devices 1Ax and 1Bx, the coils 2A and 2B, the mover 3, and the position detectors 4A and 4B.

The motor drive control devices 1Ax and 1Bx are connected to the coils 2A and 2B and the position detectors 4A and 4B, respectively, and to the controller 5. The controller 5 controls the motor drive control devices 1Ax and 1Bx.

The controller 5 transmits reception cyclic data RxPDOA to the motor drive control device 1Ax, and transmits reception cyclic data RxPDOB to the motor drive control device 1Bx. The controller 5 receives transmission data TxPDOA from the motor drive control device 1Ax, and receives transmission data TxPDOB from the motor drive control device 1Bx.

The reception cyclic data RxPDOA includes data indicating the movement target value yrefA and data indicating the power IAd to be supplied to the coils 2A. The reception cyclic data RxPDOB includes data indicating the movement target value yrefB and data indicating the power IBd to be supplied to the coils 2B.

The transmission data sets TxPDOA and TxPDOB include the transmission data sets TxA and TxB, respectively. The transmission data sets TxA and TxB in the second embodiment are substantially the same data as the transmission data TxA and TxB described in the first embodiment. That is, the transmission data TxA in the second embodiment is data specifying the power IBd to be supplied to the coils 2B, and the transmission data TxB is data specifying the power IAd to be supplied to the coils 2A.

When compared to the motor drive control devices 1A and 1B, the motor drive control devices 1Ax and 1Bx include position and speed control units 10Ax and 10Bx instead of the position and speed control units 10A and 10B, respectively. When compared to the motor drive control devices 1A and 1B, the motor drive control devices 1Ax and 1Bx include current control units 11Ax and 11Bx instead of the current control units 11A and 11B, respectively. In addition, the motor drive control devices 1Ax and 1Bx include controller communication units 15Ax and 15Bx instead of the data communication units 13A and 13B, respectively.

The motor drive control devices 1Ax and 1Bx supply the powers IA and IB to the coils 2A and 2B so that the movement detection values yA and yB of the mover 3 follow the movement target values yrefA and yrefB extracted from the reception cyclic data sets RxPDOA and RxPDOB, respectively.

The controller communication units 15Ax and 15Bx receive the reception cyclic data sets RxPDOA and RxPDOB from the controller 5, respectively. The controller communication units 15Ax and 15Bx transmit the movement target values yrefA and yrefB included in the reception cyclic data sets RxPDOA and RxPDOB to the position and speed control units 10Ax and 10Bx, respectively.

The controller communication unit 15Ax generates the reception data RxA from the transmission data TxB included in the reception cyclic data RxPDOA. The controller communication unit 15Bx generates the reception data RxB from the transmission data TxA included in the reception cyclic data RxPDOB.

The controller communication units 15Ax and 15Bx transmit the generated reception data sets RxA and RxB to the current control units 11Ax and 11Bx, respectively. The reception data RxA and RxB in the second embodiment are substantially the same data as the reception data RxA and RxB described in the first embodiment. That is, the reception data RxA in the second embodiment is data in which the power IAd to be supplied to the coils 2A is specified, and the reception data RxB is data in which the power IBd to be supplied to the coils 2B is specified.

The controller communication units 15Ax and 15Bx receive the transmission data TxA and TxB from the current control units 11Ax and 11Bx, respectively. The controller communication unit 15Ax generates the transmission data TxPDOA including the transmission data TxA and transmits the transmission data TxPDOA to the controller 5. The controller communication unit 15Bx generates the transmission data TxPDOB including the transmission data TxB and transmits the transmission data TxPDOB to the controller 5. The controller communication unit 15Ax is a first controller communication unit, and the controller communication unit 15Bx is a second controller communication unit.

The position and speed control units 10Ax and 10Bx output the thrust commands τA and τB to the current control units 11Ax and 11Bx so that the movement detection values yA and yB follow the movement target values yrefA and yrefB of the mover 3 received from the controller communication units 15Ax and 15Bx, respectively.

The current control units 11Ax and 11Bx acquire the thrust commands τA and τB from the position and speed control units 10Ax and 10Bx, respectively, and acquire the movement detection values yA and yB from the detector communication units 14A and 14B, respectively. In addition, the current control units 11Ax and 11Bx acquire the current values IfbA and IfbB for the individual phases from the current detection units 12A and 12B, respectively, and acquire the reception data sets RxA and RxB transmitted from the controller communication units 15Ax and 15Bx, respectively.

The current control units 11Ax and 11Bx output the powers IA and IB to the coils 2A and 2B, respectively, and output the transmission data sets TxA and TxB to the controller communication units 15Ax and 15Bx, respectively, so that the thrust generated on the mover 3 follows the thrust commands τA and τB.

Next, information processing in the motor drive control devices 1Ax and 1Bx will be described. Here, a case where the mover 3 moves from above the coils 2A to above the coils 2B will be described. The difference between the motor drive control device 1Ax and the motor drive control device 1A is the process to transmit the power IB for the coils 2B to the motor drive control device 1B. That is, the motor drive control device 1A transmits the power IBd for the coils 2B to the motor drive control device 1B, by using the data communication unit 13A. On the other hand, the motor drive control device 1Ax transmits the power IBd for the coils 2B to the motor drive control device 1Bx, by using the controller communication unit 15Ax and the controller 5. Thus, the motor drive control device 1Ax does not require the data communication unit 13A. Likewise, the motor drive control device 1Bx does not require the data communication unit 13B.

Also in the motor drive control device 1Ax, the power IBd to be supplied to the coils 2B calculated by the current control unit 11Ax is transmitted as the reception data RxB to the current control unit 11Bx. Upon this transmission, the current control unit 11Bx acquires, from the reception data RxB, the power IBd to be supplied to the coils 2B calculated by the current control unit 11Ax, and supplies, to the coils 2B, the power IB into which the power IBd is combined with power to be supplied to the coils 2B calculated by the current control unit 11Bx itself. This enables the same effects as those of the first embodiment to be obtained even in the second embodiment. That is, the motor drive control devices 1Ax and 1Bx can eliminate a shock to the mover 3 when the mover 3 moves from the coils 2A to the coils 2B and crosses between the coils 2A and 2B.

For example, for the motor drive system 102, the controller 5 may be used to drive a moving magnet type linear motor. When compared to the motor drive control device 1A, the motor drive control device 1Ax transmits information on the power IBd to be supplied to the coils 2B to the motor drive control device 1Bx via the controller 5, and thus can eliminate the need for the data communication unit 13A, and achieve the drive of the mover 3 at a lower cost and with fewer wiring lines.

When the mover 3 moves from the coil 2B to the coil 2A, the motor drive control device 1Bx executes the processing of the motor drive control device 1Ax described above, and the motor drive control device 1Ax executes the processing of the motor drive control device 1Bx. This enables the motor drive control devices 1Ax and 1Bx to eliminate a shock to the mover 3 when the mover 3 moves from the coil 2B to the coil 2A and crosses between the coils 2A and 2B.

As described above, in the second embodiment, the motor drive control device 1Ax transmits the data specifying the power IBd to be supplied to the coils 2B to the motor drive control device 1Bx via the controller 5. Consequently, the motor drive control devices 1Ax and 1Bx can obtain the same effects as those in the first embodiment at a lower cost and with fewer wiring lines.

Third Embodiment

Next, a third embodiment will be described with reference to FIGS. 5 to 8. In the third embodiment, a correction coefficient for correcting the difference between the thrust command τA and an actual thrust is learned.

Figure 5:
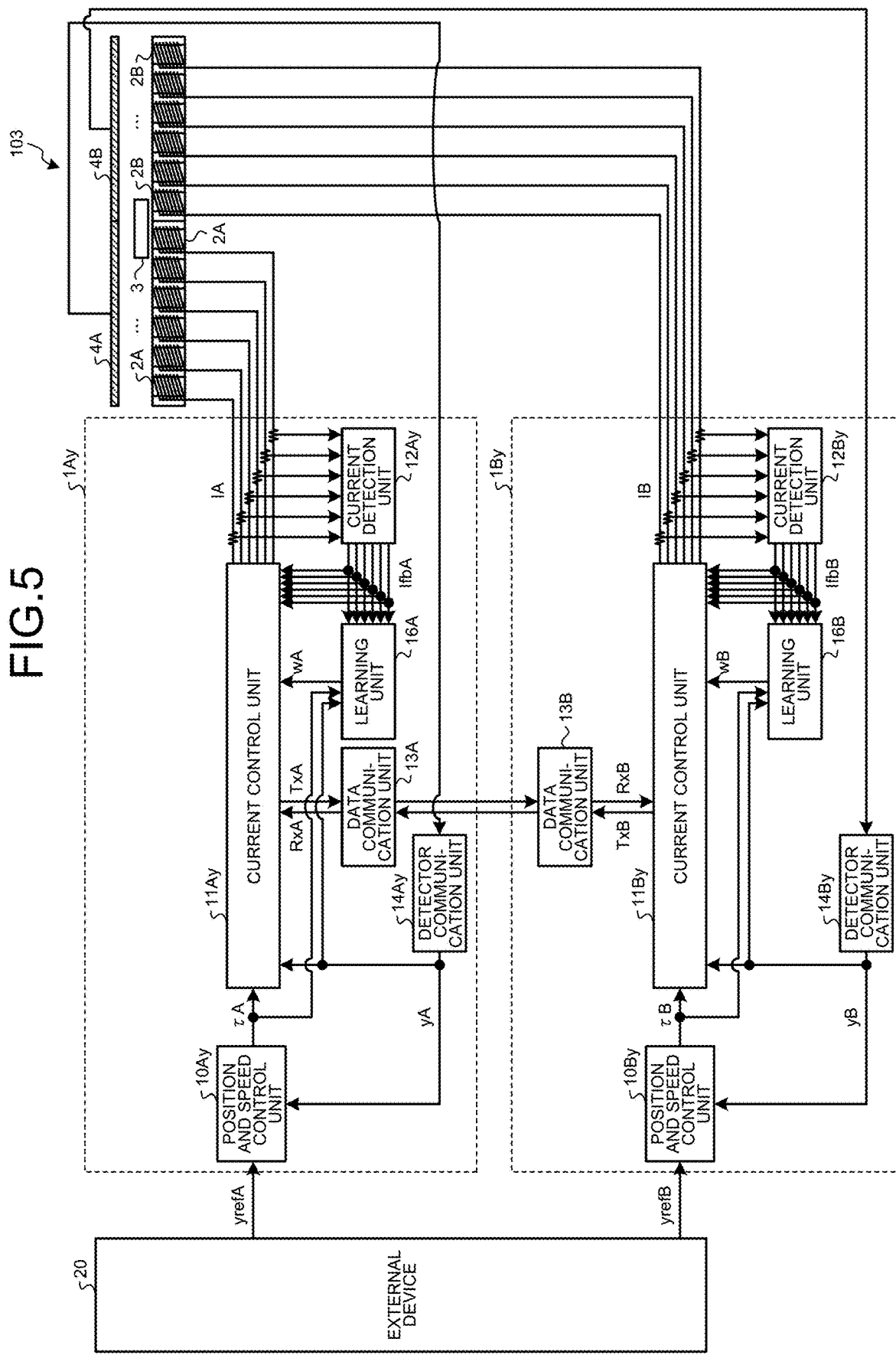
FIG. 5 is a diagram illustrating a configuration of a motor drive system including motor drive control devices according to a third embodiment.

FIG. 5 is a diagram illustrating a configuration of a motor drive system including motor drive control devices according to the third embodiment. Of the components in FIG. 5, components that achieve the same functions as those of the motor drive system 101 of the first embodiment illustrated in FIG. 1 are denoted by the same reference signs, and their redundant description is omitted.

Motor drive control devices 1Ay and 1By are devices that drive a motor by single-phase control as with the motor drive control devices 1A and 1B. When compared to the motor drive system 101, a motor drive system 103 includes the motor drive control devices 1Ay and 1By instead of the motor drive control devices 1A and 1B. That is, the motor drive system 103 includes the motor drive control devices 1Ay and 1By, the coils 2A and 2B, the mover 3, and the position detectors 4A and 4B.

When compared to the motor drive control devices 1A and 1B, the motor drive control devices 1Ay and 1By include position and speed control units 10Ay and 10By instead of the position and speed control units 10A and 10B, respectively. When compared to the motor drive control devices 1A and 1B, the motor drive control devices 1Ay and 1By include current control units 11Ay and 11By instead of the current control units 11A and 11B, respectively. In addition, when compared to the motor drive control devices 1A and 1B, the motor drive control devices 1Ay and 1By include current detection units 12Ay and 12By instead of the current detection units 12A and 12B, respectively. The motor drive control devices 1Ay and 1By include detector communication units 14Ay and 14By instead of the detector communication units 14A and 14B, respectively. The motor drive control devices 1Ay and 1By include learning units 16A and 16B, respectively.

The current detection units 12Ay and 12By detect electric currents flowing through the coils 2A and 2B for the individual phases, and output the detected current values IfbA and IfbB for the individual phases to the current control units 11Ay and 11By and the learning units 16A and 16B.

The detector communication units 14Ay and 14By receive signals indicating the position, speed, or the like of the mover 3 from the position detectors 4A and 4B, and output values corresponding to the received signals as the movement detection values yA and yB to the position and speed control units 10Ay and 10By, the current control units 11Ay and 11By, and the learning units 16A and 16B, respectively.

The position and speed control units 10Ay and 10By output the thrust commands τA and τB to the current control units 11Ay and 11By and the learning units 16A and 16B so that the movement detection values yA and yB follow the movement target values yrefA and yrefB of the mover 3 inputted from the external device 20, respectively.

The current control units 11Ay and 11By acquire the thrust commands τA and τB from the position and speed control units 10Ay and 10By, respectively, and acquire the movement detection values yA and yB from the detector communication units 14Ay and 14By, respectively. The current control units 11Ay and 11By acquire the current values IfbA and IfbB for the individual phases from the current detection units 12Ay and 12By, respectively, and acquire the reception data sets RxA and RxB transmitted from the data communication units 13A and 13B, respectively. In addition, the current control units 11Ay and 11By acquire output data sets wA and wB from the learning units 16A and 16B, respectively.

The current control units 11Ay and 11By output the powers IA and IB to the coils 2A and 2B and output the transmission data sets TxA and TxB to the data communication units 13A and 13B so that the thrust generated on the mover 3 follows the thrust commands τA and τB, respectively. Further, the current control units 11Ay and 11By in the third embodiment correct the values of the transmission data sets TxA and TxB with use of the output data wA and wB from the learning units 16A and 16B, respectively.

The learning units 16A and 16B acquire the thrust commands τA and τB calculated by the position and speed control units 10Ay and 10By, respectively, and acquire the current values IfbA and IfbB for the individual phases detected by the current detection units 12Ay and 12By, respectively. The learning units 16A and 16B acquire the movement detection values yA and yB detected by the detector communication units 14Ay and 14By, respectively.

The learning units 16A and 16B calculate thrust forces generated on the mover 3 from the current values IfbA and IfbB and the movement detection values yA and yB, respectively. The learning units 16A and 16B perform their respective learning processes such that the calculated thrust forces follow the thrust commands τA and τB, and outputs, as the output data wA and wB, output based on the learned results to the current control units 11Ay and 11By, respectively. The output data sets wA and wB are correction coefficients for correcting the power IA and IB, respectively. Accordingly, the learning units 16A and 16B learn the correction coefficients for correcting the power IA and IB so that the calculated thrust forces follows the thrust commands τA and τB, respectively.

Next, information processing in the motor drive control devices 1Ay and 1By will be described. Here, a case where the mover 3 moves from above the coil 2A to above the coil 2B will be described. Also in the motor drive control device 1Ay, information on the power IBd to be supplied to the coils 2B calculated by the current control unit 11Ay is transmitted to the current control unit 11By as with the motor drive control device 1A.

The current control unit 11By acquires the power IBd to be supplied to the coils 2B calculated by the current control unit 11Ay from the reception data RxB, combines the power IBd and power to be supplied to the coils 2B calculated by the current control unit 11By itself into the power IB, and supplies the power IB to the coils 2B.

When calculating the power IBd to be supplied to the coils 2B, the current control unit 11Ay uses information such as the coil positions for the individual phases of the coils 2B together with the position information on the mover 3.

Figure 6:
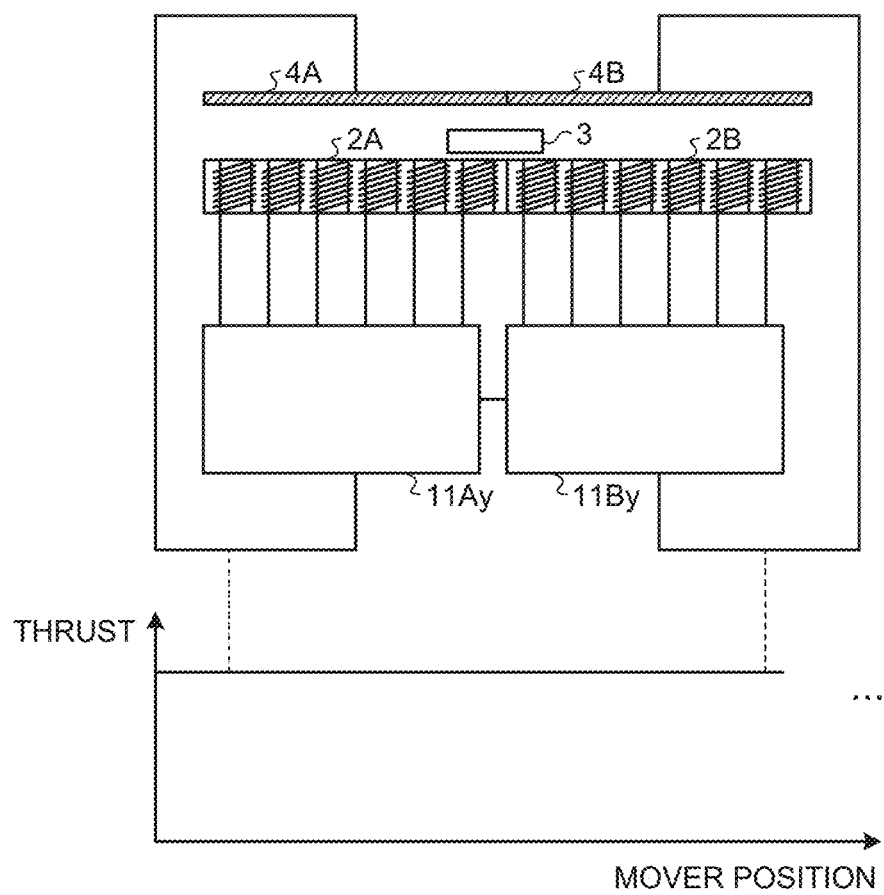
FIG. 6 is a diagram illustrating an arrangement example of coils recognized by the motor drive control devices in the motor drive system according to the third embodiment.
Figure 7:
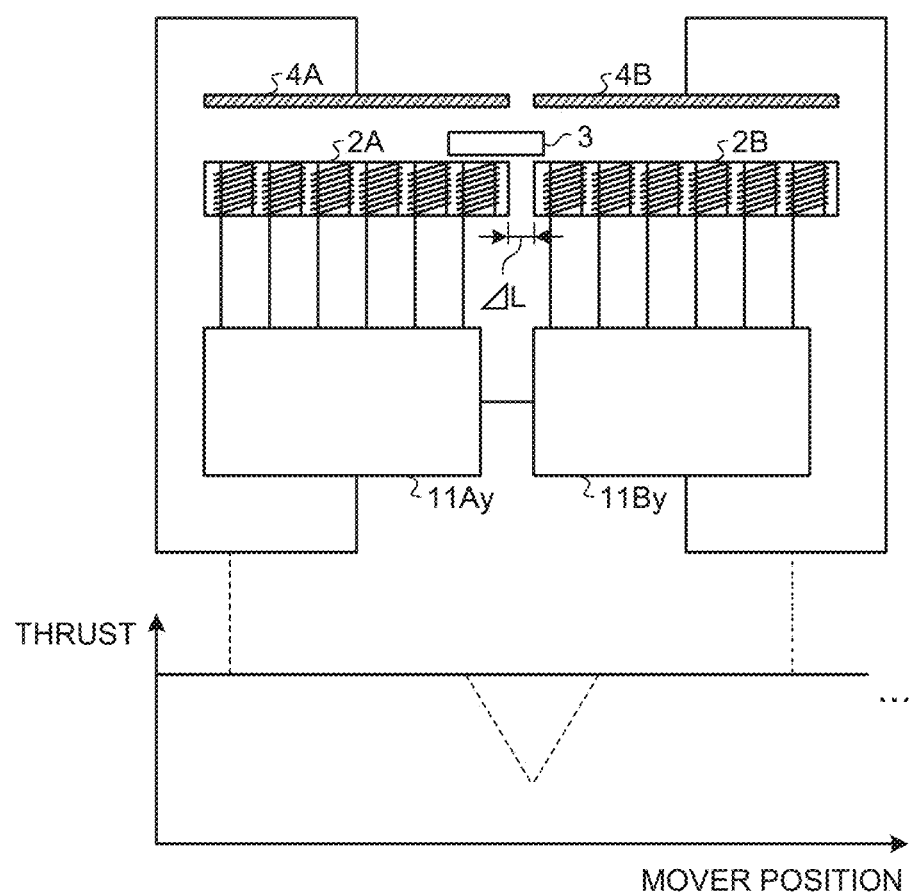
FIG. 7 is a diagram illustrating an arrangement example of coils actually used in the motor drive system according to the third embodiment.

FIG. 6 is a diagram illustrating an example of arrangement of coils recognized by the motor drive control devices in the motor drive system according to the third embodiment. FIG. 7 is a diagram illustrating an example of actual arrangement of coils in the motor drive system according to the third embodiment. FIG. 6 illustrates an example of arrangement of the coils 2B recognized by the current control unit 11Ay. FIG. 7 illustrates an example of actual arrangement of the coils 2B.

FIG. 6 illustrates a case where the coils 2A and 2B are arranged without a gap between the coil 2B and the coil 2A. FIG. 7 illustrates a case where the coils 2A and 2B are arranged with a gap of CL provided between the coil 2B and the coil 2A.

As just described, information on the arrangement of the coils 2B grasped by the motor drive control device 1Ay may be different from the actual arrangement of the coils 2B. In such a case, even if the motor drive control device 1By extracts the power IBd to be supplied to the coils 2B from the reception data RxB received from the motor drive control device 1Ay, and supplies the power IB as is to the coils 2B, a deviation occurs between a thrust force generated on the mover 3 and the thrust command τA calculated in the motor drive control device 1Ay.

To correct this deviation, the learning units 16A and 16B learn the correction coefficients so that the calculated thrust forces generated on the mover 3 follow the thrust commands τA and τB, and output, as the output data sets wA and wB, outputs based on the learned results to the current control units 11A and 11B, respectively.

Then, the current control units 11Ay and 11By correct the values of the transmission data sets TxA and TxB, using the output data sets wA and wB, respectively. That is, the current control unit 11Ay corrects the value of the power IBd to be sent to the current control unit 11By, and the current control unit 11By corrects the value of the power IAd to be sent to the current control unit 11Ay.

In this way, the motor drive control device 1Ay can calculate the power IBd that takes into consideration the difference between the grasped information on the arrangement of the coils 2B and the actual arrangement of the coils 2B. Likewise, the motor drive control device 1By can calculate the power IAd that takes into consideration the difference between the grasped information on the arrangement of the coils 2A and the actual arrangement of the coils 2A.

The current control unit 11By extracts the power IBd to be supplied to the coils 2B from the reception data RxB received from the current control unit 11Ay, combines the power IBd and power to be supplied to the coils 2B calculated by the current control unit 11By itself into the power IB, and supplies the power IB to the coils 2B. By so doing, even when there is caused a difference between the information on the arrangement of the coils 2B grasped by the motor drive control device 1Ay and the actual arrangement of the coils 2B, the motor drive system 103 can cause a thrust force generated on the mover 3 to follow the thrust command TA.

In a similar manner, the current control unit 11Ay extracts the power IAd to be supplied to the coils 2A from the reception data RxA received from the current control unit 11By, combines the power IAd and power to be supplied to the coils 2A calculated by the current control unit 11Ay itself into the power IA, and supplies the power IA to the coils 2A. As a result, even when there is caused a difference between the information on the arrangement of the coils 2A grasped by the motor drive control device 1By and the actual arrangement of the coils 2A, the motor drive system 103 can cause a thrust force generated on the mover 3 to follow the thrust command τB.

Figure 8:
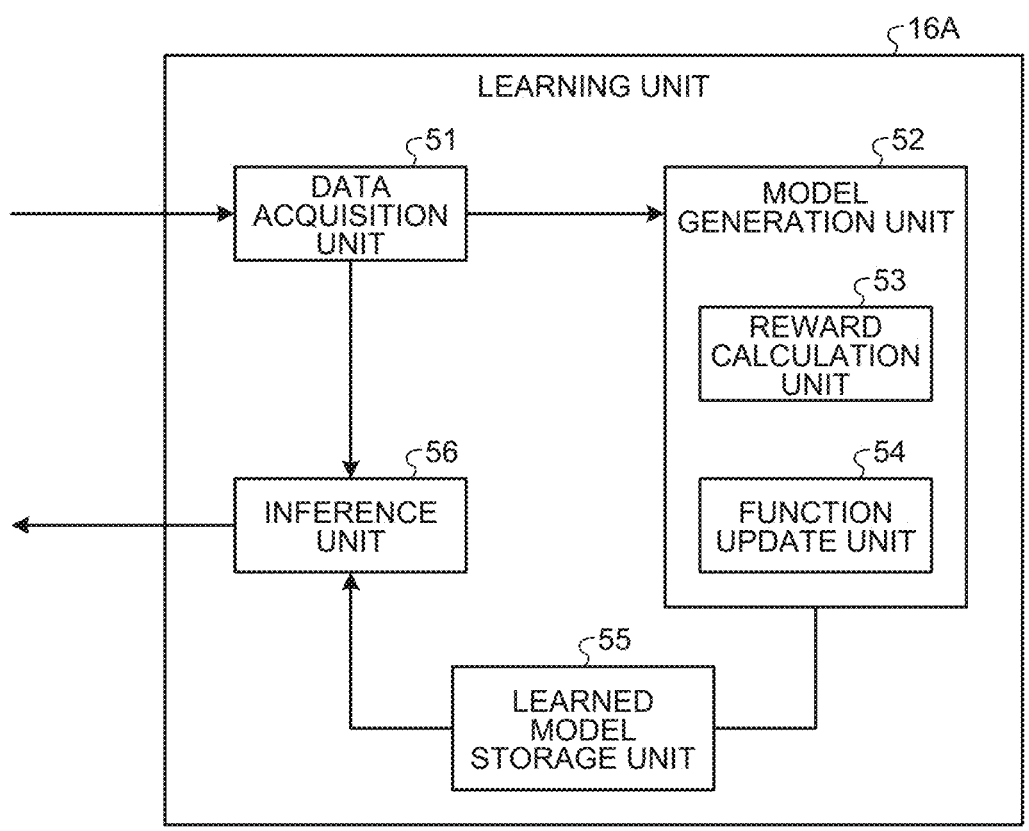
FIG. 8 is a diagram illustrating a configuration of a learning unit included in the motor drive control device according to the third embodiment.

Here, the configurations of the learning units 16A and 16B will be described. The learning units 16A and 16B have their respective similar configurations, and so the configuration of the learning unit 16A will be described here. FIG. 8 is a diagram illustrating the configuration of the learning unit included in each motor drive control device according to the third embodiment.

The learning unit 16A includes a data acquisition unit 51, a model generation unit 52, a learned model storage unit 55, and an inference unit 56. The data acquisition unit 51 acquires the correction coefficient, the current values IfbA, the movement detection value yA, and the thrust command TA as data for learning.

The model generation unit 52 learns a learned model for inferring the correction coefficient, based on the data for learning including the correction coefficient, the thrust command TA, the current values IfbA, and the movement detection value yA. That is, the model generation unit 52 generates the learned model for inferring the correction coefficient from the correction coefficient, the current values IfbA, the movement detection value yA, and the thrust command TA.

For a learning algorithm used by the model generation unit 52, a publicly known algorithm such as supervised learning, unsupervised learning, semi-supervised learning, or reinforcement learning can be used. As an example, a case where reinforcement learning is applied to the model generation unit 52 will be described. In reinforcement learning, an agent in a certain environment (action subject) observes a current state (an environmental parameter) and determines an action to take. The agent's action dynamically changes the environment, and the agent is given a reward according to the change in environment. The agent repeats this process and learns an action course by which the highest reward can be obtained through a series of actions. As typical methods for the reinforcement learning, Q-learning and TD-learning are known. For example, in the case of Q-learning, a typical update expression of an action value function Q(s,a) is represented by the following expression (1).

[Formula 1]

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

In the expression (1), $s_t$ represents an environmental state at a time t, and $a_t$ represents an action at the time t. The state is changed to $s_{t+1}$ in response to the action $a_t$. $r_{t+1}$ represents a reward given due to the change in state, $\gamma$ represents a discount rate, and $\alpha$ represents a learning rate. $\gamma$ is in the range of $0 \leq \gamma \leq 1$, and $\alpha$ is in the range of $0 \leq \alpha \leq 1$. The correction coefficient serves as the action $a_t$, and the difference between the thrust command τA and an actual thrust and the thrust command τA serve as the state $s_t$, so as to learn the best action at in the state $s_t$ at the time t. The actual thrust is a thrust force on the mover 3 calculated from the current values IfbA and the movement detection value yA.

In the update expression represented by the expression (1), if the action value Q of the action "a" having the highest Q value at the time t+1 is larger than the action value Q of the action "a" performed at the time t, the action value Q is increased, but otherwise the action value Q is reduced. In other words, the action value function Q(s,a) is updated so that the action value Q of the action "a" at the time t approaches the best action value at the time t+1. Thus, the best action value in a certain environment is sequentially propagated to the action values in the previous environments.

In a case where the learned model is generated by reinforcement learning as described above, the model generation unit 52 includes a reward calculation unit 53 and a function update unit 54.

The reward calculation unit 53 calculates the reward based on the thrust command TA, the current values IfbA, and the movement detection value yA. The reward calculation unit 53 calculates the reward r based on the difference (hereinafter, referred to as thrust difference) between a thrust force on the mover 3 calculated from the current values IfbA and the movement detection value yA and the thrust command TA. For example, the reward calculation unit 53 increases the reward "r" (for example, gives a reward of "1") when the thrust difference decreases, and, on the other hand, reduces the reward "r" (for example, gives a reward of "−1") when the thrust difference increases.

The function update unit 54 updates a function for determining the correction coefficient in accordance with the reward calculated by the reward calculation unit 53, and outputs the updated function to the learned model storage unit 55. For example, in the case of Q-learning, the action value function $Q(s_t, a_t)$ represented by the expression (1) is used as a function for calculating the correction coefficient.

The above learning process is performed repeatedly. The learned model storage unit 55 stores the action-value function $Q(s_t, a_t)$ updated by the function update unit 54, that is, the learned model.

The inference unit 56 reads out the learned model from the learned model storage unit 55 and receives the thrust command τA from the data acquisition unit 51. The inference unit 56 infers the correction coefficient using the learned model. That is, by inputting the thrust command τA, current values IfbA, and movement detection value yA acquired by the data acquisition unit 51 to the learned model, the inference unit 56 can infer the correction coefficient suitable for the thrust command τA, the current values IfbA, and the movement detection value yA. That is, the inference unit 56 can infer the correction coefficient suitable for the thrust command τA and the thrust difference, with use of the learned model, the thrust command τA, and the thrust difference. The inference unit 56 outputs the inferred correction coefficient as the output data wA to the current control unit 11Ay.

Next, processing procedures of learning processing and inference processing of the learning units 16A and 16B will be described with reference to FIGS. 9 and 10. Since the learning units 16A and 16B execute their respective equal processings, just the processing of the learning unit 16A will be described here.

Figure 9:
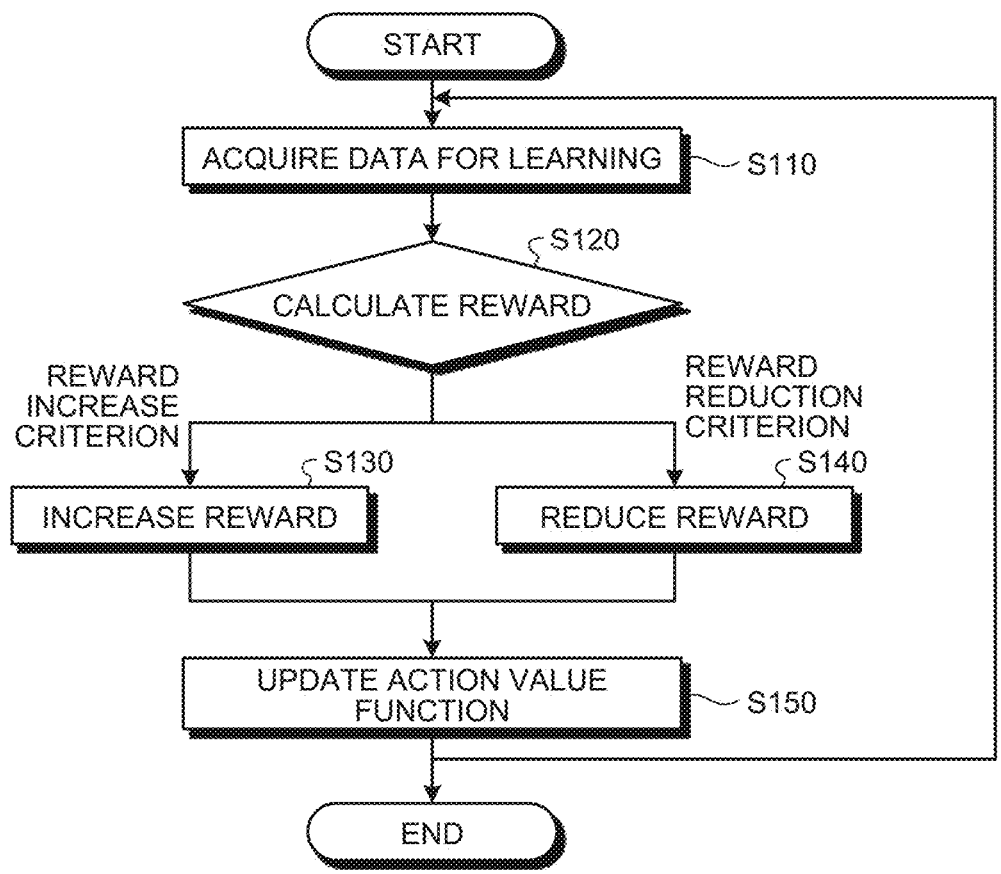
FIG. 9 is a flowchart illustrating a processing procedure of learning processing performed by the learning unit of the motor drive control device according to the third embodiment.

FIG. 9 is a flowchart illustrating the processing procedure of the learning processing performed by the learning unit of the motor drive control device according to the third embodiment. The data acquisition unit 51 acquires the correction coefficient, the thrust command τA, the current values IfbA, and the movement detection value yA as data for learning (step S110).

The model generation unit 52 calculates a reward on the basis of the correction coefficient, the thrust command τA, the current values IfbA, and the movement detection value yA (step S120). Specifically, the reward calculation unit 53 acquires the correction coefficient, the thrust command τA, the current values IfbA, and the movement detection value yA, and determines whether to increase the reward or reduce the reward on the basis of a thrust difference that is a predetermined reward criterion.

When the reward calculation unit 53 determines that the reward should be increased (step S120, a reward increase criterion), the reward calculation unit 53 increases the reward (step S130). On the other hand, when the reward calculation unit 53 determines that the reward should be reduced (step S120, a reward reduction criterion), the reward calculation unit 53 reduces the reward (step S140).

The function update unit 54 updates the action-value function $Q(s_t, a_t)$ represented by the expression (1) stored in the learned model storage unit 55, based on the reward calculated by the reward calculation unit 53 (step S150).

The learning unit 16A repeatedly executes the steps of steps S110 to S150 described above and stores the generated action value function $Q(s_t, a_t)$ as a learned model in the learned model storage unit 55.

Figure 10:
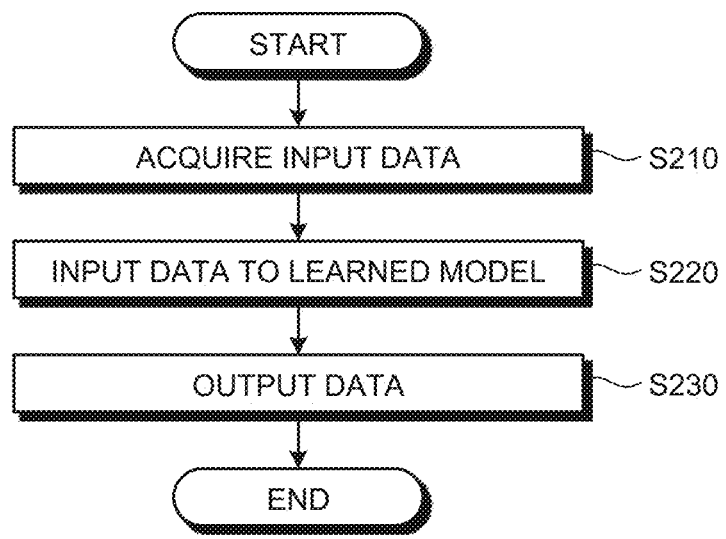
FIG. 10 is a flowchart illustrating a processing procedure of inference processing performed by the learning unit of the motor drive control device according to the third embodiment.

FIG. 10 is a flowchart illustrating the processing procedure of the inference processing performed by the learning unit of the motor drive control device according to the third embodiment. The data acquisition unit 51 acquires the thrust command τA, the current values IfbA, and the movement detection value yA as input data (step S210).

The inference unit 56 inputs the thrust command τA, the current values IfbA, and the movement detection value yA to the learned model stored in the learned model storage unit 55 (step S220), and obtains the correction coefficient. The inference unit 56 outputs the correction coefficient that is the obtained data as the output data wA to the current control unit 11Ay (step S230).

The current control unit 11Ay outputs the transmission data TxA to the data communication unit 13A using the output data wA so that the thrust force generated on the mover 3 follows the thrust command τA. This enables the motor drive control device 1Ay to prevent a drop in thrust when the mover 3 passes between the coils 2A and 2B adjacent to each other, to thereby making it possible to ensure sufficient smoothness of movement.

As the learning algorithm used in the model generation unit 52, deep learning to learn extraction of a feature quantity itself may be used. The model generation unit 52 may perform machine learning according to another publicly known method, for example, a neural network, genetic programming, functional logic programming, a support vector machine, or the like.

The learning unit 16A may be, for example, a device that is separate from the motor drive control device 1Ay and connected to the motor drive control device 1Ay via a network. In another respect, the learning unit 16A may exist on a cloud server.

Although the learning unit 16A according to the third embodiment stores the learned model in the learned model storage unit 55 provided inside the learning unit 16A, the learned model storage unit 55 may be disposed outside the learning unit 16A.

The second and third embodiments may be combined. That is, the motor drive control devices 1Ay and 1By may be configured to perform transmission and reception of the transmission data sets TxA and TxB and the reception data sets RxA and RxB using the controller 5 and the controller communication units 15Ax and 15Bx described in the second embodiment.

Figure 11:
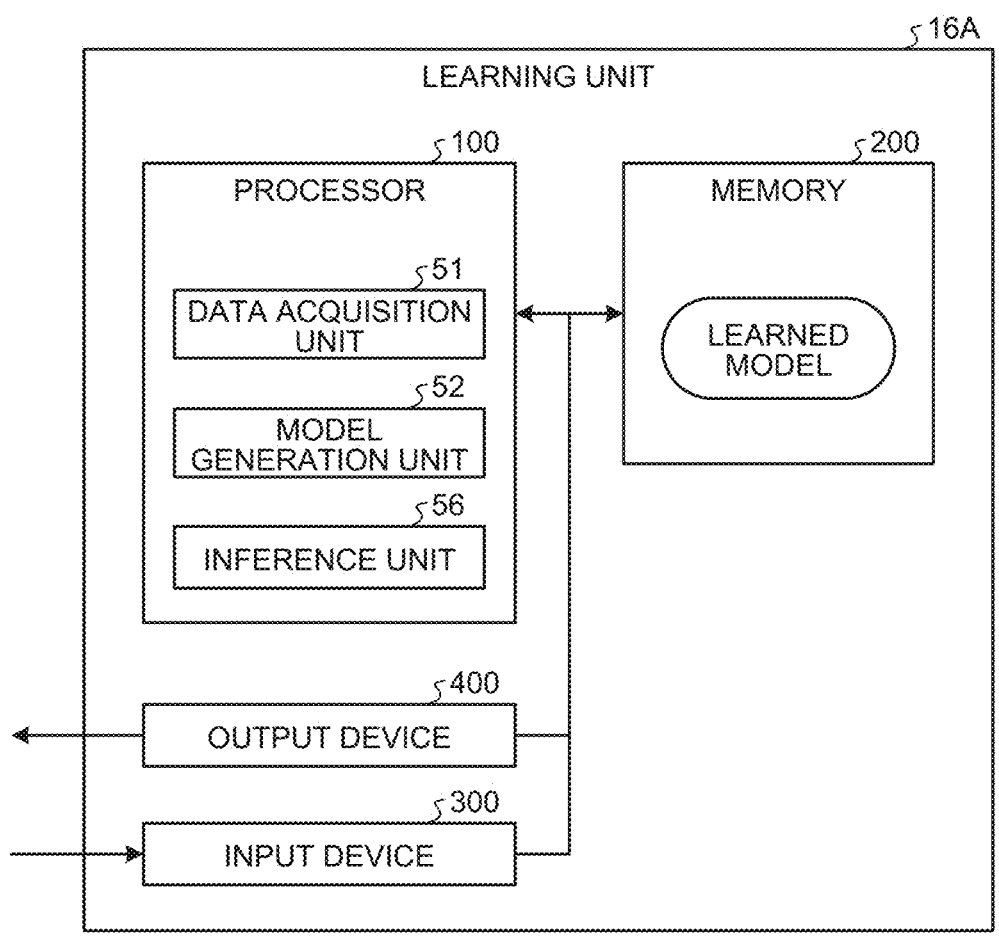
FIG. 11 is a diagram illustrating an example of a hardware configuration for implementing the learning unit according to the third embodiment.

Here, a hardware configuration of the learning units 16A and 16B will be described. FIG. 11 is a diagram illustrating an example of a hardware configuration for implementing the learning unit according to the third embodiment. The learning units 16A and 16B have their respective equal hardware configurations, and so this part gives description for just the hardware configuration of the learning unit 16A.

The learning unit 16A can be implemented by a processor 100, a memory 200, an input device 300, and an output device 400. An example of the processor 100 is a central processing unit (CPU, also called a central processor, a processing device, an arithmetic device, a microprocessor, a microcomputer, or a digital signal processor (DSP)), or a system large-scale integration (LSI) circuit. Examples of the memory 200 are random-access memory (RAM) and read-only memory (ROM).

The learning unit 16A is implemented by the processor 100 reading and executing a learning program and an inference program that are computer-executable and configured to perform the operation of the learning unit 16A, the programs having been stored in the memory 200. It can also be said that the learning program and the inference program, which are programs for performing the operation of the learning unit 16A is a means to cause a computer to carry out the procedures or methods in the learning unit 16A.

The learning program executed for the learning unit 16A has a module configuration including the data acquisition unit 51 and the model generation unit 52, wherein these units 51 and 52 are loaded onto a main storage device and formed on the main storage device. The inference program executed for the learning unit 16A has a module configuration including the data acquisition unit 51 and the inference unit 56, wherein these units 51 and 56 are loaded onto the main storage device and formed on the main storage device.

The input device 300 receives the current values IfbA from the current detection unit 12Ay, receives the movement detection value VA from the detector communication unit 14Ay, and receives the thrust command τA from the position and speed control unit 10Ay. The input device 300 sends the current values IfbA, the movement detection value yA, and the thrust command τA to the processor 100. The memory 200 stores the learned model and others therein. The memory 200 is also used as a temporary memory when the processor 100 executes various types of processing. The output device 400 outputs the correction coefficient to the current control unit 11Ay.

The learning program and the inference program may be stored in a computer-readable storage medium in the form of files of an installable-format or executable-format and provided as a computer program product. Alternatively, the learning program and the inference program may be provided to the learning unit 16A via a network such as the Internet. The functions of the learning unit 16A may be partly implemented by a dedicated hardware set such as a dedicated circuit and partly implemented by software or firmware. All or part of the motor drive control devices 1A, 1Ax, 1Ay, 1B, 1Bx, and 1By has a hardware configuration similar to that of the learning unit 16A.

As described above, in the third embodiment, the learning unit 16A learns the correction coefficient corresponding to the thrust difference. Consequently, even when information on the arrangement of the coils 2B grasped by the motor drive control device 1Ay is different from the actual arrangement of the coils 2B, the motor drive control device 1Ay can achieve the same effects as those of the first embodiment. Likewise, since the learning unit 16B learns the correction coefficient corresponding to the thrust difference, the motor drive control device 1By can achieve the same effects as those of the first embodiment.

The configurations described in the above embodiments illustrate just examples and can be combined with other publicly known techniques. The embodiments can be combined with each other. Each of the configurations can be partly omitted or modified without departing from the scope of the present disclosure.

In the first embodiment described above, there has been described a mode in which the current control units 11A and 11B transmit and receive the transmission data TxA and TxB via the data communication units 13A and 13B. However, the transmission and reception of the transmission data TxA and TxB may be performed in a configuration different from that in this mode. For example, a configuration may be adopted in which the current control units 11A and 11B directly transmit and receive the transmission data TxA and TxB. This configuration can simplify the functional blocks while achieving the effects of the present disclosure.

In the second embodiment described above, there has been described a mode in which the current control units 11Ax and 11Bx transmit and receive the transmission data TxA and TxB via the controller communication units 15Ax and 15Bx and the controller 5. However, the transmission and reception of the transmission data TxA and TxB may be performed in a configuration different from that in this mode. For example, a configuration may be adopted in which the current control units 11Ax and 11Bx directly transmit and receive the transmission data TxA and TxB. Even in this configuration, the effects of the present disclosure can be achieved.

In the third embodiment described above, there has been described a mode in which the current control units 11Ay and 11By transmit and receive the transmission data TxA and TxB via the data communication units 13A and 13B. However, the transmission and reception of the transmission data TxA and TxB may be performed in a configuration different from that in this mode. For example, a configuration may be adopted in which the current control units 11Ay and 11By directly transmit and receive the transmission data TxA and TxB. This configuration can simplify the functional blocks while achieving the effects of the present disclosure.

REFERENCE SIGNS LIST 1A, 1Ax, 1Ay, 1B, 1Bx, 1By motor drive control device; 2A, 2B coil; 3 mover; 4A, 4B position detector; 5 controller; 10A, 10Ax, 10Ay, 10B, 10Bx, 10By position and speed control unit; 11A, 11Ax, 11Ay, 11B, 11Bx, 11By, 11P, 11Q current control unit; 12A, 12Ay, 12B, 12By current detection unit; 13A, 13B data communication unit; 14A, 14Ay, 14B, 14By detector communication unit; 15Ax, 15Bx controller communication unit; 16A, 16B learning unit; 20 external device; 51 data acquisition unit; 52 model generation unit; 53 reward calculation unit; 54 function update unit; 55 learned model storage unit; 56 inference unit; 100 processor; 101 to 103 motor drive system; 200 memory; 300 input device; 400 output device.

The invention claimed is:

1. A motor drive system, comprising:
a first motor drive control device to supply first power to first coils of a coil group consisting of a plurality of coils arranged successively; and
a second motor drive control device to supply second power to second coils of the coil group that are adjacent to the first coils,
wherein the first motor drive control device comprises:
a movement information communication unit to acquire a movement detection value representing a movement position or a movement speed of a mover moving along the first coils;
a position and speed control unit to generate a thrust command to the mover that is a command to cause the movement detection value to follow a movement target value that is a time-series movement target value received from an external device; and
a current control unit to supply, to the first coils, the first power to cause thrust generated on the mover to follow the thrust command, and generate data on third power to be supplied to the second coils and transmit the data on the third power to the second motor drive control device when the mover moves from the first coil to the second coil, and
the second motor drive control device supplies the second power calculated using the data on the third power to the second coils.

2. The motor drive system according to claim 1, wherein the first motor drive control device further includes
a first data communication unit to transmit the data on the third power to the second motor drive control device, and
the second motor drive control device includes
a second data communication unit to receive the data on the third power from the first motor drive control device.

3. The motor drive system according to claim 1, wherein the first motor drive control device and the second motor drive control device are connected to a controller to control the first motor drive control device and the second motor drive control device,
the first motor drive control device further includes
a first controller communication unit to transmit the data on the third power to the controller, and
the second motor drive control device includes
a second controller communication unit to receive the data on the third power from the controller.

4. The motor drive system according to claim 1, wherein the first motor drive control device
receives data on fourth power to be supplied to the first coils, the data being transmitted from the second motor drive control device, and
the current control unit
supplies the first power calculated using the data on the fourth power to the first coils.

5. The motor drive system according to claim 1, wherein the first motor drive control device further comprises:
a current detection unit to detect current values indicating currents flowing through the first coils; and
a learning unit to learn a correction coefficient for the data on the third power, based on the correction coefficient for the data on the third power that has been used to drive the mover, the thrust command, and a thrust difference that is a difference between the thrust command and an actual thrust on the mover, and
the current control unit generates the data on the third power, based on the correction coefficient learned by the learning unit.

6. The motor drive system according to claim 5, wherein the learning unit comprises:
a data acquisition unit to acquire data for learning including the correction coefficient for the data on the third power that has been used to drive the mover and the thrust command,
a model generation unit to generate a learned model for inferring the correction coefficient from the thrust command and the thrust difference, using the data for learning, and
an inference unit to infer the correction coefficient from the thrust command and the thrust difference acquired by the data acquisition unit, using the learned model, and output the inferred correction coefficient to the current control unit.

7. The motor drive system according to claim 5, wherein the learning unit
calculates actual thrust on the mover, based on the current values and the movement detection value.

* * * * *